(12) United States Patent
Yang

(10) Patent No.: US 7,407,311 B2
(45) Date of Patent: Aug. 5, 2008

(54) LIGHT WITH A RING STRUCTURE FOR A VEHICLE LAMP

(76) Inventor: Hsiu-Pen Yang, No. 427, Sec. 2, Wenhua Rd., Panchiao, Taipei (TW)

( * ) Notice: Subject to any disclaimer, the term of this patent is extended or adjusted under 35 U.S.C. 154(b) by 98 days.

(21) Appl. No.: 11/313,819

(22) Filed: Dec. 22, 2005

(65) Prior Publication Data

US 2006/0268563 A1    Nov. 30, 2006

(30) Foreign Application Priority Data

May 24, 2005    (TW) .............................. 94208462 U

(51) Int. Cl.
*F21V 7/04*    (2006.01)
(52) U.S. Cl. .................. 362/555; 362/612; 362/545
(58) Field of Classification Search ............... 362/612, 362/555, 800, 545, 511, 517, 522, 540
See application file for complete search history.

(56) References Cited

U.S. PATENT DOCUMENTS

| | | | |
|---|---|---|---|
| 6,107,916 A * | 8/2000 | Beck et al. ................ | 340/468 |
| 6,347,880 B1 * | 2/2002 | Furst et al. ................ | 362/494 |
| 6,504,477 B1 * | 1/2003 | Lin .......................... | 340/472 |
| 6,789,929 B1 * | 9/2004 | Doong et al. .............. | 362/511 |
| 6,871,988 B2 * | 3/2005 | Gebauer et al. ............ | 362/511 |
| 2002/0122316 A1 * | 9/2002 | Hsieh ........................ | 362/570 |

* cited by examiner

*Primary Examiner*—Jong-Suk (James) Lee
*Assistant Examiner*—Julie A. Shallenberger
(74) *Attorney, Agent, or Firm*—Charles R. Sutton

(57) ABSTRACT

A light with a ring structure for a vehicle lamp has a light-guiding ring with a dull face, a light-emitting element, and a reflective cover. The light-guiding ring defines a front annular face and has a cavity. The light-emitting element is disposed in the cavity. The reflective cover is disposed on a part of the front annular face and corresponds to the cavity. The light-guiding ring with a dull face guides light emitted by the light-emitting element therein. The reflective cover reflects the light into the light-guiding ring. As such, the brightness of the light with a ring structure is even to improve the warning function of a vehicle lamp to ensure a safer driving experience for its user.

1 Claim, 3 Drawing Sheets

LIGHT WITH A RING STRUCTURE FOR A VEHICLE LAMP

BACKGROUND OF THE INVENTION

1. Field of the Invention

The present invention relates to a light with a ring structure, and more particularly, to a light with a ring structure for a vehicle lamp.

2. Background of the Invention

Vehicle lamps (headlights and taillights, etc) of cars, vans or motorcycles illuminate the road ahead of a driver to ensure that the driver can see clearly and enjoy a pleasant and safe journey. They also have warning function—other vehicles' drivers can plainly see the position of an oncoming or reversing vehicle and thus take all necessary precautions to avoid a collision.

However, conventional vehicle lamps lack a structure that makes it more conspicuous. As a result, its warning function is poor.

SUMMARY OF THE INVENTION

The primary object of the invention is therefore to specify a light with a ring structure for a vehicle lamp to improve the warning function of a vehicle lamp to ensure a safer driving experience for its user.

According to the invention, the object is achieved via a light with a ring structure for a vehicle lamp. The light with a ring structure comprises a light-guiding ring with a dull face, a light-emitting element, and a reflective cover. The light-guiding ring defines a front annular face and has a cavity. The light-emitting element is disposed in the cavity. The reflective cover is disposed on a part of the front annular face and corresponds to the cavity.

The light-guiding ring with a dull face guides light emitted by the light-emitting element therein. The reflective cover reflects the light into the light-guiding ring. As such, the brightness of the light with a ring structure is even to improve the warning function of a vehicle lamp to ensure a safer driving experience for its user.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention which will be described hereinafter and which will form the subject of the claims appended hereto.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE EMBODIMENTS

Figure 1:
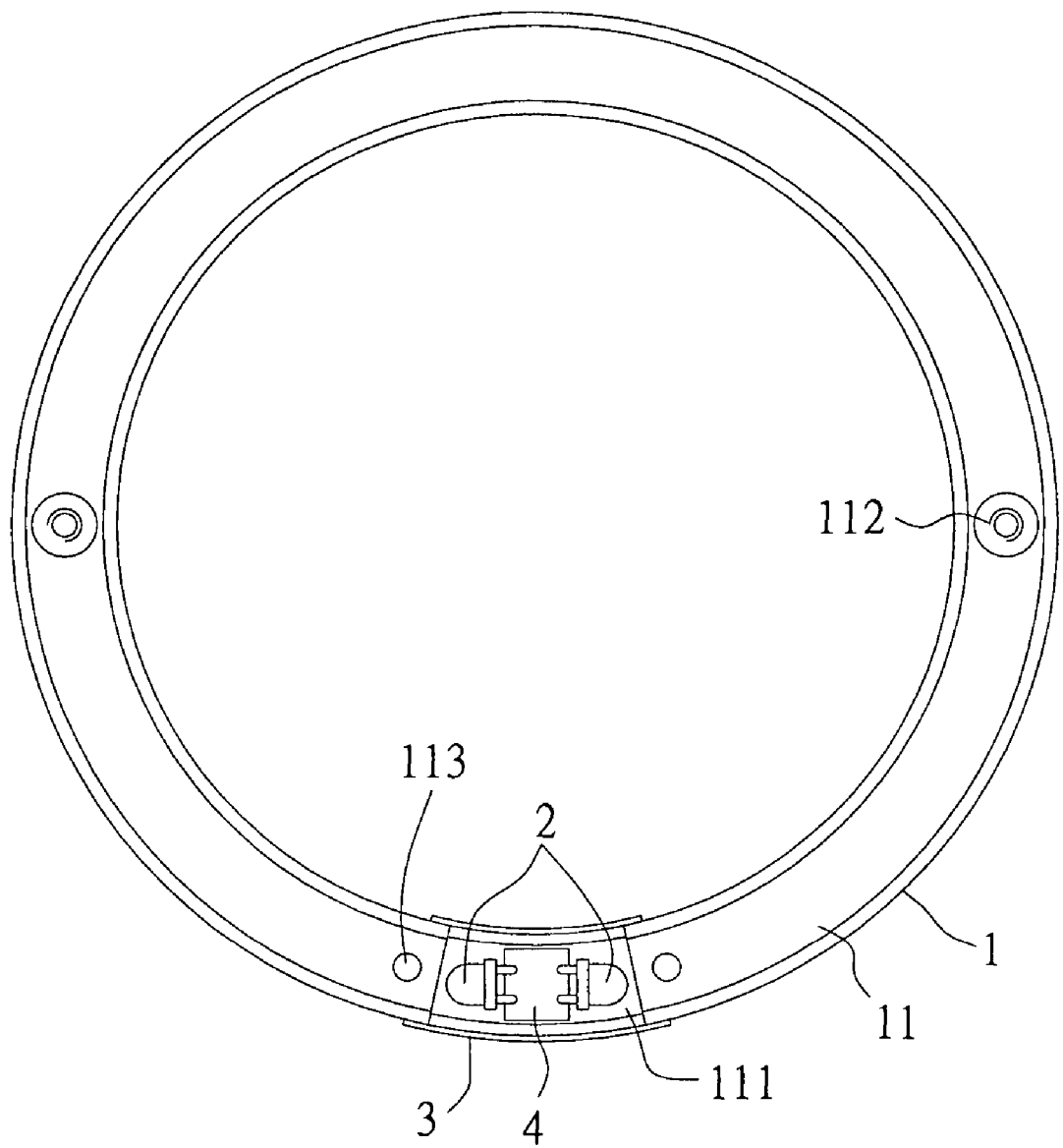
FIG. 1 is a rear view of a light with a ring structure for a vehicle lamp of the present invention.
Figure 2:
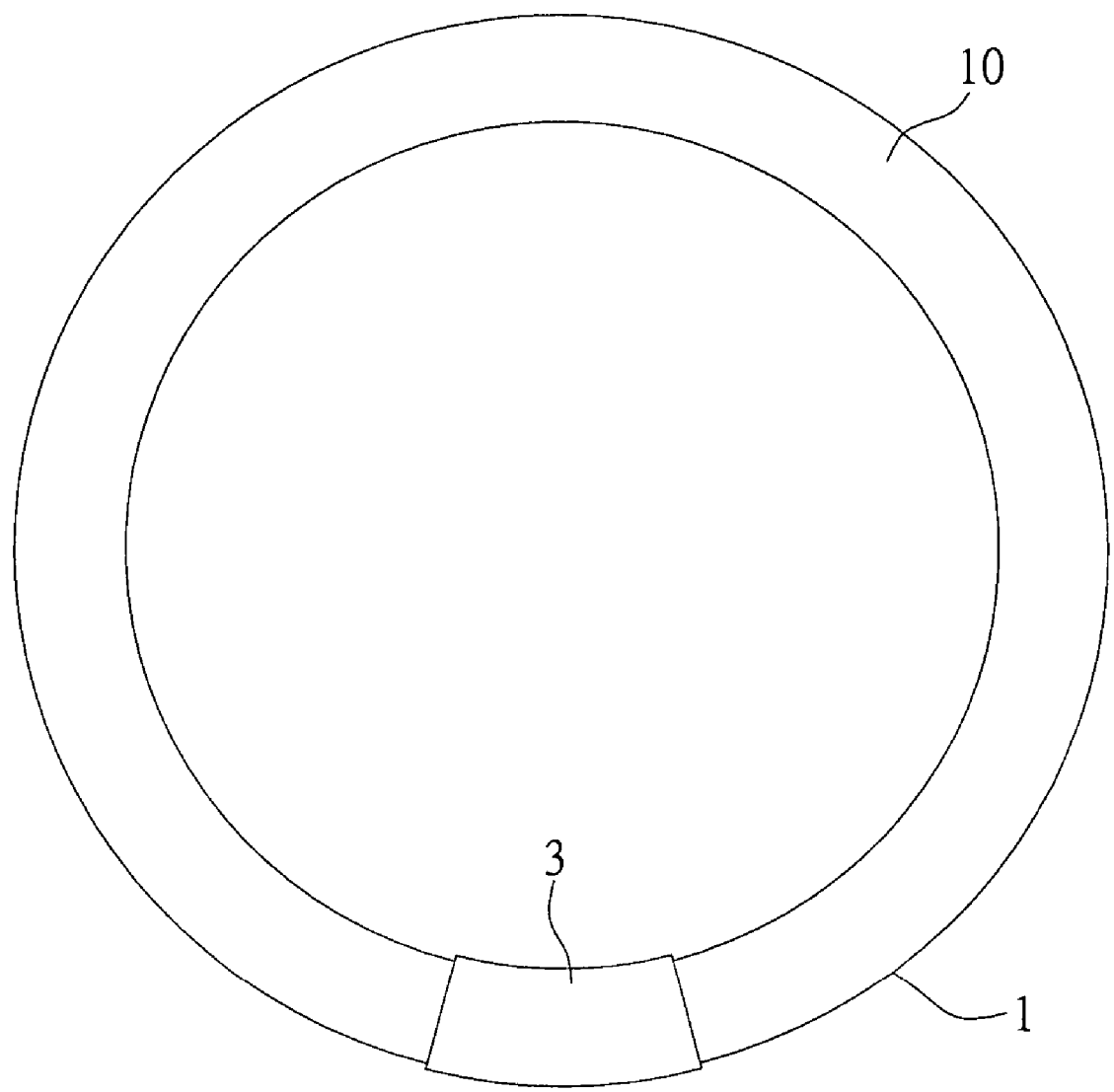
FIG. 2 is a front view of a light with a ring structure for a vehicle lamp of the present invention.
Figure 3:
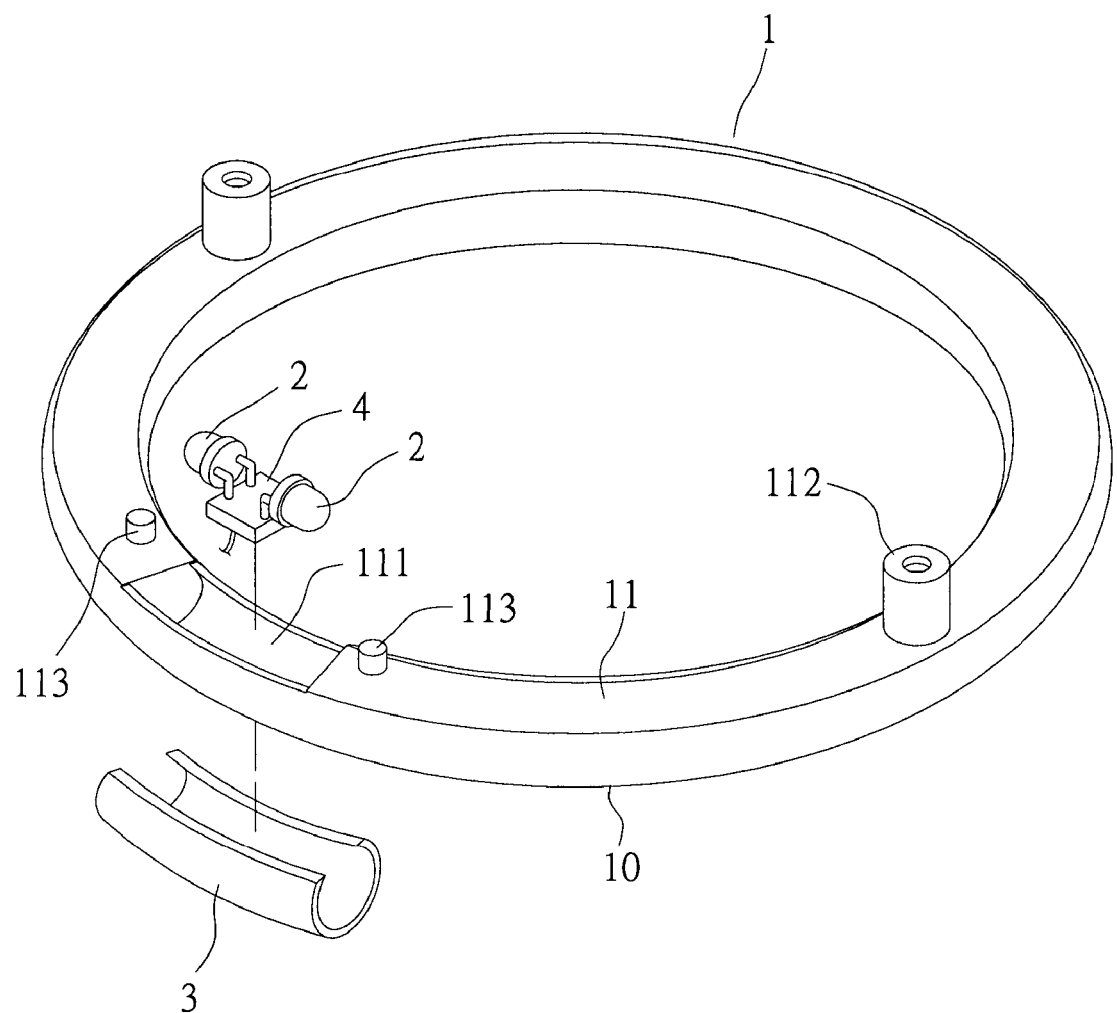
FIG. 3 an exploded perspective view of a light with a ring structure for a vehicle lamp of the present invention.

Referring to FIGS. 1-3, the present invention provides a light with a ring structure for a vehicle lamp. The light with a ring structure is installed in a vehicle lamp (headlight or taillight, etc). The light with a ring structure comprises a light-guiding ring 1 with a dull face, a light-emitting element 2, and a reflective cover 3.

The light-guiding ring 1 with a dull face defines a front annular face 10 and a rear annular face 11. The light-guiding ring 1 has a cavity 111. In this embodiment, the cavity 111 is formed in the rear annular face 11. The rear annular face 11 of the light-guiding ring 1 has two positioning posts 112 disposed on two opposite sides thereof, respectively, for fixing the light-guiding ring 1 into the vehicle lamp. The quantity of the positioning posts 112 can be increased or decreased according to the installation requirements of the light-guiding ring 1. The rear annular face 11 of the light-guiding ring 1 has two protrusions 113 disposed on two outer sides of the cavity 111, respectively, for further reliably fixing a part of the light-guiding ring 1 corresponding to the cavity 111 into the vehicle lamp.

The light-emitting element 2 is disposed in the cavity 111. The light-emitting element 2 is an LED and can be fixed into the cavity 111 in a fastened or adhesive manner. In this embodiment, the light-emitting element 2 has a quantity of two. The light-emitting elements 2 face two ends of the cavity, respectively. Therefore, light emitted by the light-emitting elements 2 directly illuminates the light-guiding ring 1.

The light with a ring structure for a vehicle lamp of the present invention further comprises a circuit board 4. The circuit board 4 is disposed in the cavity 111. The light-emitting element 2 is electrically connected to the circuit board 4 to form a light-emitting module. The illumination mode of the light of the light-emitting element 2 is controlled by the circuit board 4. For example, the illumination mode of the light of the light-emitting element 2 can be a flashing mode or a sustained illumination mode. The circuit board 4 can be disposed outside the cavity 111.

The reflective cover 3 is disposed on a part of the front annular face 10 of the light-guiding ring 1 and corresponds to the cavity 111. The shape of the reflective cover 3 is adapted to the shape of the light-guiding ring 1. In this embodiment, the front annular face 10 of the light-guiding ring 1 has a cambered surface, and the reflective cover 3 has a cambered shape and hooks onto the light-guiding ring 1. The reflective cover 3 can be adhered onto the light-guiding ring 1 via an adhesive, or can be fastened onto the light-guiding ring 1 via screws.

When the light with a ring structure for a vehicle lamp of the present invention is installed into a vehicle lamp, the rear annular face 11 of the light-guiding ring 1 faces the vehicle, and the front annular face 10 of the light-guiding ring 1 faces outside the vehicle. In other words, when the light with a ring structure is installed in a headlight of the vehicle, the front annular face 10 of the light-guiding ring 1 faces ahead of the vehicle, and when the light with a ring structure is installed in a taillight of the vehicle, the front annular face 10 of the light-guiding ring 1 faces behind the vehicle.

When light emitted by the light-emitting element 2 illuminates into the light-guiding ring 1, the light-guiding ring 1 with a dull face efficiently guides the light therein. The reflective cover 3 reflects the light into the light-guiding ring 1. As such, the brightness of the light with a ring structure is even and the outline of the vehicle lamp is distinct so that other vehicles' drivers can see the position of the vehicle easily.

Therefore, the light with a ring structure for a vehicle lamp of the present invention improves the warning function of a vehicle lamp to ensure a safer driving experience for its user.

As indicated above, the light with a ring structure for a vehicle lamp of the present invention has the following advantages:

1. The light-guiding ring with a dull face guides light emitted by the light-emitting element therein. The reflective cover reflects the light into the light-guiding ring. As such, the brightness of the light with a ring structure is even to improve the warning function of a vehicle lamp to ensure a safer driving experience for its user.

2. The protrusions of the rear annular face of the light-guiding ring are disposed on two outer sides of the cavity, respectively, so that a part of the light-guiding ring corresponding to the cavity is reliably fixed into the vehicle lamp.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A light with a ring structure for a vehicle lamp, comprising:
    a light-guiding ring with a dull face, the light-guiding ring defining a front annular face and a rear annular face, the rear annular face having a cavity formed therein;
    the front annular face of the light-guiding ring has a cambered surface, and the reflective cover has a cambered shape and hooks onto the light-guiding ring;
    a light emitting element disposed in the cavity; and
    a reflective cover covering a portion of the front annular face corresponding to the cavity, whereby light emitted from the light-emitting element is reflected by the reflective cover into the light guiding ring for providing a substantially uniform light transmission through said light-guiding ring.

* * * * *

UNITED STATES PATENT AND TRADEMARK OFFICE
CERTIFICATE OF CORRECTION

PATENT NO. : 7,407,311 B2
APPLICATION NO. : 11/313819
DATED : August 5, 2008
INVENTOR(S) : Hsiu-Pen Yang It is certified that error appears in the above-identified patent and that said Letters Patent is hereby corrected as shown below:

At Column 4, Line 5 et seq. Claim 1 is rearranged as follows:

1. A light with a ring structure for a vehicle lamp, comprising:
a light-guiding ring with a dull face, the light-guiding ring defining a front annular face and a rear annular face, the rear annular face having a cavity formed therein;
<u>a light emitting element disposed in the cavity;</u>
<u>a reflective cover covering a portion of the front annular face corresponding to the cavity, whereby light emitted from the light-emitting element is reflected by the reflective cover into the light-guiding ring for providing a substantially uniform light transmission through said light-guiding ring;</u>
~~the front annular face of the light-guiding ring has a cambered surface, and the reflective cover has a cambered shape and hooks onto the light-guiding ring;~~
~~a light emitting element disposed in the cavity; and~~
~~a reflective cover covering a portion of the front annular face corresponding to the cavity, whereby light emitted from the light-emitting element is reflected by the reflective cover into the light-guiding ring for providing a substantially uniform light transmission through said light-guiding ring~~
<u>the front annular face of the light-guiding ring has a cambered surface, and the reflective cover has a cambered shape and hooks onto the light-guiding ring</u>.

To produce the following claim:

1. A light with a ring structure for a vehicle lamp, comprising:
a light-guiding ring with a dull face, the light-guiding ring defining a front annular face and a rear annular face, the rear annular face having a cavity formed therein;
a light emitting element disposed in the cavity;

Signed and Sealed this
Twenty-sixth Day of July, 2011

David J. Kappos
*Director of the United States Patent and Trademark Office* a reflective cover covering a portion of the front annular face corresponding to the cavity, whereby light emitted from the light-emitting element is reflected by the reflective cover into the light-guiding ring for providing a substantially uniform light transmission through said light-guiding ring; and the front annular face of the light-guiding ring has a cambered surface, and the reflective cover has a cambered shape and hooks onto the light-guiding ring.